April 17, 1934.    R. K. HOPKINS    1,954,999
ELECTRIC ARC WELDING APPARATUS
Filed March 10, 1933    2 Sheets-Sheet 1

Robert K. Hopkins
INVENTOR
BY Virgil F. Davis
ATTORNEY

April 17, 1934.    R. K. HOPKINS    1,954,999
ELECTRIC ARC WELDING APPARATUS
Filed March 10, 1933    2 Sheets-Sheet 2

Robert K. Hopkins
INVENTOR

BY Virgil F. Davies
ATTORNEY

Patented Apr. 17, 1934

1,954,999

UNITED STATES PATENT OFFICE 1,954,999

ELECTRIC ARC WELDING APPARATUS

Robert K. Hopkins, New York, N. Y., assignor to The M. W. Kellogg Co., New York, N. Y., a corporation of Delaware Application March 10, 1933, Serial No. 660,220

17 Claims. (Cl. 219—8)

This invention relates in general to electric arc welding, and in particular to apparatus for passing welding current to a covered welding electrode on its way to the arc.

At present covered welding electrodes of the rod type, as distinguished from the wire type, are used with welding machines at short individual lengths. The practice being to clamp a bare end of a length of electrode in the welding head of the welding machine, welding until the usable portion of the welding electrode is consumed, retracting the welding head, clamping therein a new length of welding electrode and again welding; this procedure being repeated until the weld is complete. During the welding the welding current is passed to the bare end of the metallic core of the welding electrode through the welding head. The practice just outlined is not satisfactory as at least one half the operating time is consumed in retracting the welding head and replacing welding electrode lengths. It is not economical as a substantial portion of each length of welding electrode is wasted. Also due to the intermittent character of the welding the procedure outlined is not conductive to the production of perfect welds.

In my copending application Serial No. 610,553, filed May 11, 1932, I have disclosed a method and apparatus for carrying out welding with a covered welding electrode as a continuous operation, the welding electrode being continuous and of indefinite lengths, i. e., it being made up of an indefinite number of easily connectible sections, and having small portions of the non-conducting covering removed at spaced points along its length to expose the metallic core so as to allow the passing of the welding current to the metallic core. The present invention contemplates a contact device to be used in connection with welding electrodes of the character disclosed in my copending application above identified.

It is an object of this invention to provide a contact device of simple rugged construction which is adapted to continuously pass the welding current to the covered electrode of the character above mentioned as the electrode is fed to the work.

Figure 1:
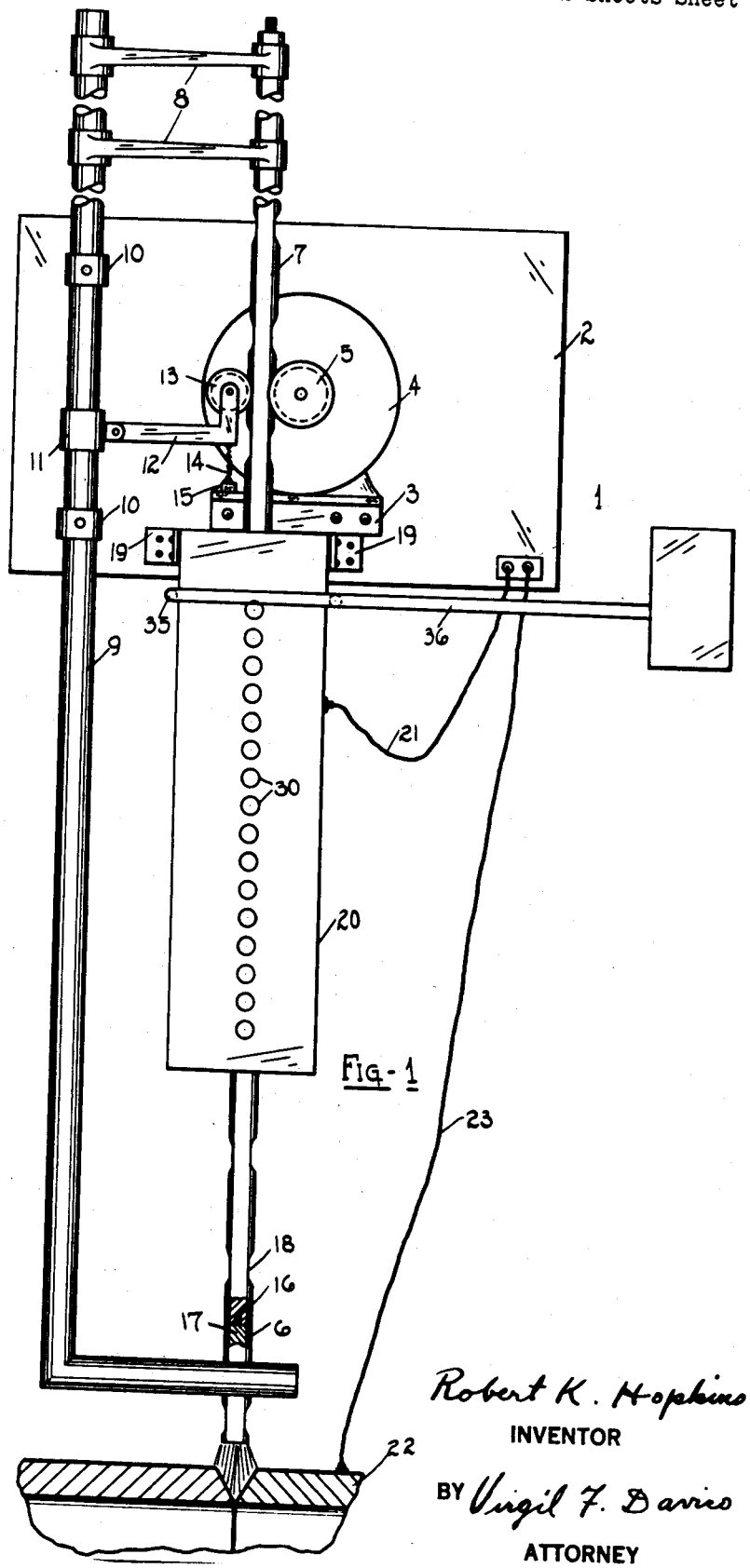

The further objects and advantages of this invention will be appreciated from a consideration of the description which follows, taken with the accompanying drawings, in which, Fig. 1 is a front elevation of an electric arc welding machine, which includes the contact device of my invention.

Figure 2:
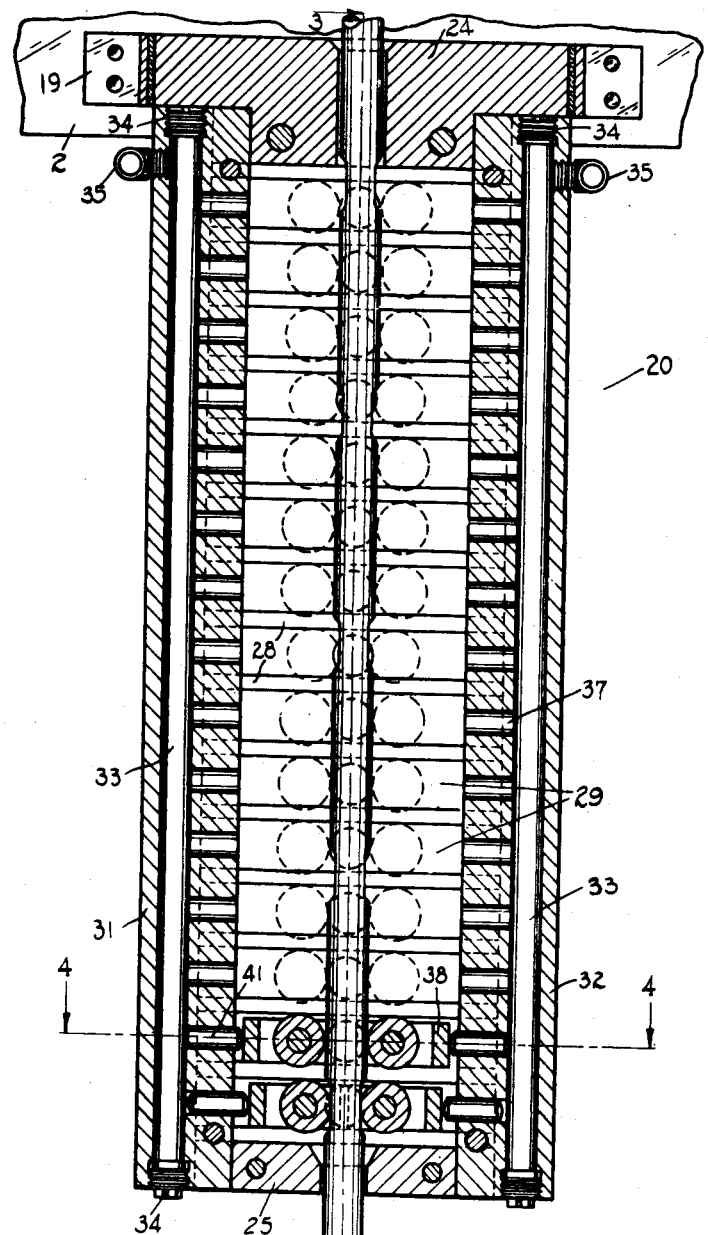
Figure 3:
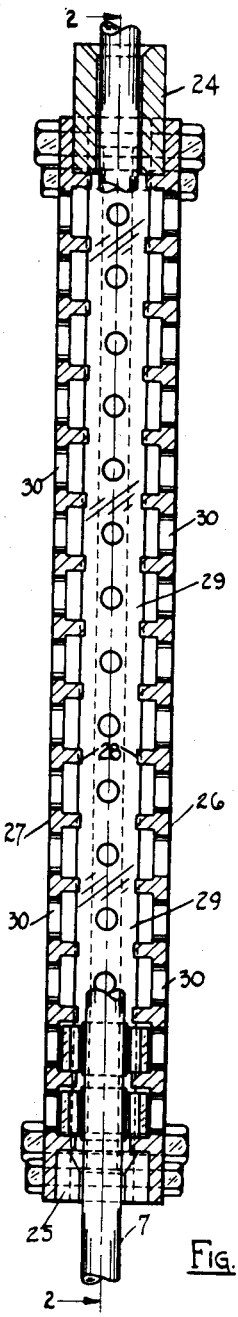
Figure 4:
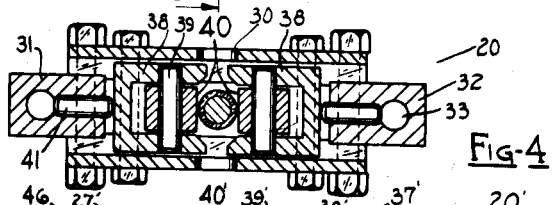
Figure 5:
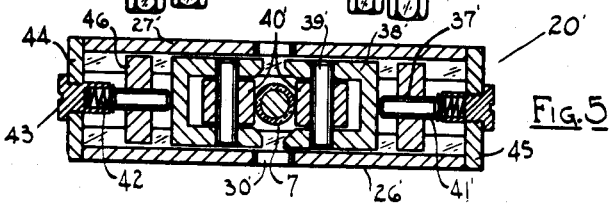

Fig. 2 is a front sectional elevation of the contact device of my invention taken on line 2—2 of Fig. 3, Fig. 3 is an end sectional view taken on line 3—3 of Fig. 2, Fig. 4 is a top sectional view taken on line 4—4 of Fig. 2, and Fig. 5 is a view similar to Fig. 4 of a somewhat different embodiment of my invention.

Referring to the drawings:—

Electric arc welding machine 1 is of the automatic type and includes welding current supply means, welding electrode feed motor control means, and electrode oscillating means of a character well known in the art. These means are not per se part of this invention, hence they will not be described and will be considered as located in the rear of panel 2 with the electrode oscillating means mounted to oscillate panel 2.

A bracket 3 is fastened to the front of panel 2 and has mounted thereon welding electrode feeding motor 4 to the shaft of which is fastened electrode feeding wheel 5. Wheel 5 is preferably provided with a rubber, or similar material, contact portion so as not to injure the non-conducting coating 6 of the welding electrode 7. The upper end of welding electrode 7 is guided to feeding wheel 5 by guides 8 fastened to support 9 which is supported from panel 2 by means of brackets 10. The lower end of support 9 is bent and perforated to allow the passage of welding electrode 7 therethrough. This end of support 9 serves to guide the lower end of welding electrode 7 as it passes to the arc.

On support 9 is also supported a pivot member 11 on which is pivoted yoke member 12 on which is in turn mounted the shaft of wheel 13.

A spring 14 having one end anchored in member 12 and the other end anchored in a small bracket 15, fastened to bracket 3, causes wheel 13 to bear on welding electrode 7 and thus prevent slippage between feeding wheel 5 and electrode 7. Wheel 13 is also provided with a rubber, or similar material, contact portion to prevent injury to the non-conducting coating 6 of electrode 7.

Welding electrode 7 is made up of a plurality of connected sections each of which is easily connectible to the preceeding section by a joint forming means, as for instance, the screw joint means 16 shown in Fig. 1, so that in effect welding electrode 7 is of indefinite length. Each section of welding electrode 7 comprises a metallic core 17 covered by a ceramic or similar coating 6 scored at spaced intervals to expose small areas 18 of core 17 through which the welding current may be passed.

To panel 2 below bracket 3 are fastened support members 19 which support between them contact device 20, suitable insulation being provided between device 20 and support members 19 to electrically insulate support brackets 19 from device 20. A cable 21 connects device 20 to the welding current source, previously stated as located in back of panel 2, the other side of the welding current source is connected to the work 22 by means of cable 23. The usual switches, meters etc., which are very well known in the art, per se form no part of this invention and hence are not described.

Contact device 20 includes a top 24 and a bottom 25 to which are fastened by bolts front and rear walls 26 and 27. Walls 26 and 27 are alike and each includes a plurality of extensions 28 which serve to define a plurality of parallel vertically spaced roller chambers 29. Along the middle of walls 26 and 27 are peep holes 30 which open into roller chambers 29 and through which the functioning of device 20 may be observed. Device 20 is completed by members 31 and 32 which form the end walls. Members 31 and 32 are also alike and each includes a bore 33 having plugs 34 at the ends thereof and an air line connector 35 adjacent the top. Compressed air is passed to bores 33 through a compressed air line 36. The wall of each of members 31 and 32 is bored at spaced intervals to provide piston chambers 37. Each piston chamber 37 opens into the middle of one end of its roller chamber 29.

In each of roller chambers 29 is a pair of oppositely arranged crossheads 38 supported for movement on the pair of projections 28 which define the floor of the particular roller chamber 29. To simplify the drawings, crossheads 38 have only been shown in the bottom two of chambers 29, however, it is to be understood that there is a pair of crossheads 38 in each of chambers 29. Rollers 40 have been shown in dotted lines in all of the other roller chambers 29. In each of crossheads 38 is journalled a shaft 39 on which is mounted for rotation a roller 40. In each of piston chambers 37 is a piston 41 which is adapted through the pressure exerted by the compressed air in bore 33 to constantly urge crosshead 38 and roller 40 toward electrode 7. Thus as electrode 7 passes through contact device 20 each of rollers 40 is constantly in contact with it.

Contact device 20' shown in cross section in Fig. 5 is substantially identical in construction and operation as contact device 20 just described, however, in this construction compressed air line 36 as well as bores 33 are eliminated and in place thereof springs 42 are used to urge pistons 41', crossheads 38' and rollers 40' into contact with welding electrode 7. Springs 42 are held in position by glands 43 which screw into the end walls 44 and 45. The piston chambers 37' are formed in members 46 which are positioned as required by suitably fastening them to top 24' and bottom 25'.

In order that contact device 20, or contact device 20' operate as is intended it is necessary that a definite relation be maintained between the length of core 7 exposed at areas 18, the distance between exposed areas 18, the number of pairs of rollers 40 or 40', used, the diameter of rollers 40 or 40' and the vertical distance between rollers 40 or 40'. The primary consideration being to obtain a design which will insure that at least one pair of rollers 40 or 40' is at all times in contact with a pair of exposed areas 18 so that at all times rollers 40 will uninterruptedly pass welding current to the metallic core 17 of welding electrode 7. Uninterrupted passage of the welding current to core 17 of electrode 7 is assured by so designing device 20 or 20' that before one pair of rollers 40 or 40' breaks contact with a pair of exposed areas 18 another pair or pairs of rollers 40 or 40' make contact with other pairs of exposed areas 18. By providing for a proper contact overlap no trouble due to interruptions in the current feed will be experienced. The contact device 20 shown in Fig. 2 is so proportioned that it meets all of the requirements set forth and provides for sufficient contact overlap as in its operation, with electrode 7 shown, at least two pairs of rollers 40 are at all times in contact with pairs of exposed areas 18. In the operation of machine 1 work 22 is prepared for welding and located relative to machine 1 as required. Cable 23 is then connected to work 22 and the welding current circuit closed, cable 21 being already connected. The first section of electrode 7 is then passed through guides 8 to feeding wheel 5. Wheel 5 will feed welding electrode 7 to the hole in top 24 of contact device 20 and through device 20 to and through the hole in bottom 25. From this hole welding electrode 7 will pass through the hole in support 9 to work 22.

As welding electrode 7 comes into contact with the pairs of rollers 40 or 40', it will separate them and pass between them. However, since the pressure of the air in bores 33, or the pressure of springs 42, is always effective, rollers 40 or 40', will bear constantly on the sides of welding electrode 7 and pass welding current to core 17 when they come into contact with exposed areas 18. As previously stated, the arrangement is such that at least one pair of rollers 40 or 40', is at all times in contact with a pair of exposed areas 18 so that the passage of the welding current to core 17 of welding electrode 7 is continuous. When electrode 7 touches work 22 it is momentarily retracted to strike the arc, after which its movement to work 22 is continued. As the top end of the first section of electrode 7 nears feeding wheel 5 a second section is passed through guides 8 and joined to the first section of the electrode, care being taken to align the exposed areas 18 of the second section with those of the first section so that rollers 40, or 40' can contact with them as they pass through device 20 or 20' and pass the welding current to metallic core 17 of electrode 7. New sections of electrode 7 are added in this manner as required and the welding continued uninterruptedly as long as desired.

Device 20 shown in detail in Figs. 2–4, aside from the advantages that it has in common with device 20' of Fig. 5, has the further advantage that it is self cooling. The cooling of device 20 results from the air which escapes around piston 41. By properly choosing the size of pistons 41 relative to their piston chambers 37 a sufficient amount of air may be allowed to escape to prevent appreciable heating of the parts of device 20. However, care must be taken not to have pistons 41 too small relative to their piston chambers 37 or the desired pressure on rollers 40 will not be maintained.

I claim:

1. In electric arc welding apparatus, a contact device comprising a plurality of vertically spaced horizontally movable contact means each of said contact means being independently movable.

2. In electric arc welding aparatus, a contact device comprising a plurality of vertically spaced horizontally movable contact members each of said contact members being independently movable and means for constantly urging each of said contact members in one direction.

3. In electric arc welding apparatus, a contact device comprising a plurality of vertically spaced horizontally movable contact members, means supporting each of said members for independent horizontal movement, and means for constantly urging each of said members in one direction.

4. In combination with an electric arc welding electrode, a contact device, means for feeding said electrode to the work through said device, said device comprising a plurality of vertically spaced horizontally movable contact means adapted to contact with said electrode as it passes through said device each of said contact means being independently movable.

5. In combination with an electric arc welding electrode, a contact device, means connecting said device to a welding current supply, means for feeding said electrode through said device, said device comprising a plurality of vertically spaced horizontally movable contact means, and means for constantly urging said contact means into contact with said electrode each of said contact means being independently movable.

6. In combination with an electric arc welding electrode having a conducting core and a non-conducting covering therefor scored at spaced intervals to expose small areas of said core, a contact device, means connecting said device to a welding current supply, means for feeding said electrode through said device, said device including a plurality of vertically spaced horizontally movable contact means and means for uninterruptedly urging said means into contact with said electrode as it passes through said device whereby said contact means pass current to said core through said exposed areas as said areas pass through said device.

7. In combination with an electric arc welding electrode having a conducting core and a non-conducting covering therefor scored at spaced intervals to expose small areas of said core, a contact device, means connecting said device to a welding current supply, means for feeding said electrode through said device, said device including a plurality of vertically spaced horizontally movable contact means and means for uninterruptedly urging said means into contact with said electrode as it passes through said device whereby said contact means pass current to said core through said exposed areas as said areas pass through said device, said electrode and said device being so proportioned that at least one of said contact means is at all times in contact with one of said exposed areas.

8. In electric arc welding apparatus, a contact device comprising, a plurality of vertically spaced pairs of horizontally movable contact members, means supporting said members for horizontal movement, and means for constantly urging the members of each pair toward each other.

9. In combination with an electric arc welding electrode having a conducting core and a non-conducting covering therefor scored at spaced intervals to expose pairs of small areas of said core, a contact device, means connecting said device to a welding current supply, and means for passing said electrode through said device, said device comprising a plurality of vertically spaced horizontally movable pairs of contact members, means supporting said members for horizontal movement, the members of each of said pairs of members being located on opposite sides of the electrode path through said device, and means for constantly urging each of said members into contact with said electrode whereby said members contact with said areas to pass welding current to said core.

10. In combination with an electric arc welding electrode having a conducting core and a non-conducting covering therefor scored at spaced intervals to expose pairs of small areas of said core, a contact device, means connecting said device to a welding current supply, and means for passing said electrode through said device, said device comprising a plurality of vertically spaced horizontally movable pairs of contact members, means supporting said members for horizontal movement, the members of each of said pairs of members being located on opposite sides of the electrode path through said device, and means for constantly urging each of said members into contact with said electrode, said contact device and said electrode being so proportioned that at all times there is at least one pair of said contact members in contact with one pair of said exposed areas whereby the passage of current to said core is continuous.

11. In electric arc welding apparatus, a contact device comprising a plurality of vertically spaced roller chambers, a pair of rollers in each of said chambers and means for uninterruptedly urging said rollers toward each other.

12. In electric arc welding apparatus, a contact device comprising a plurality of vertically spaced roller chambers, a pair of roller supports in each of said chambers, a roller mounted on each of said supports and means for uninterruptedly urging the supports of each pair of supports towards each other.

13. In electric arc welding apparatus, a contact device comprising a plurality of vertically spaced roller chambers, a pair of roller supports in each of said chambers, a roller mounted on each of said supports, a piston chamber at each end of each of said roller chambers, a piston in each of said piston chambers adapted to contact with its adjacent roller support, and means constantly exerting a force on said pistons whereby said pistons constantly urge said roller supports and said rollers toward each other.

14. In electric arc welding apparatus, a contact device comprising a front wall, a rear wall, side walls, said front and rear walls each including vertically spaced parallel ledges which separate the space within said walls into a plurality of superimposed chambers, a pair of roller supports in each of said chambers, a contact roller mounted for rotation on each of said supports, vertical bores in each of said end walls, piston chambers in each of said end walls connecting said chambers to said bores, pistons in said piston chambers and means for passing compressed air to said bores whereby the pressure exerted by the air on said pistons moves the pistons, roller supports and rollers in each of said chambers toward each other.

15. In combination with an electric arc welding electrode having a conducting core and a non-conducting covering therefor scored at spaced intervals to expose pairs of small areas of said core, welding electrode feeding means, a contact device, means connecting said device to a welding current source, said device comprising, a front wall, a rear wall, side walls, said front and rear walls each including vertically spaced parallel ledges which separate the space within said walls into a plurality of superimposed chambers, means allowing passage of said electrode through said device, roller supports in each of said chambers on each side of the electrode path horizontally movable on said ledges, a contact roller mounted for rotation in each of said supports, piston chambers in each of said side walls communicating with said superimposed chambers, vertical bores in each of said side walls communicating with said piston chambers, and means for passing compressed air to said bores whereby the pressure exerted by the air on said pistons moves said pistons to maintain said rollers in contact with the electrode passing through said device and pass the welding current to said core through said exposed areas, said device and said electrode being so proportioned that at all times at least the rollers in one of said chambers are in contact with one pair of said exposed areas.

16. In electric arc welding apparatus, a contact device comprising a plurality of vertically spaced roller chambers, a pair of supports in each of said chambers, a roller mounted on each of said supports, a piston chamber at each end of each of said roller chambers, pistons in said piston chambers adapted to contact with said roller supports, and springs adapted to constantly urge said pistons toward each other.

17. In electric arc welding apparatus, a contact device comprising, a front wall, a rear wall, said front and rear walls each including vertically spaced parallel ledges which separate the space between said walls into a plurality of superimposed roller chambers, a pair of roller supports in each of said chambers horizontally movable on said ledges, contact rollers mounted for rotation on said supports, a pair of members forming end walls for said chambers, piston chambers in each of said members opening in each of said chambers, pistons in said piston chambers, springs adapted to contact with said pistons, and means for supporting said springs.

ROBERT K. HOPKINS.

DISCLAIMER 1,954,999.—*Robert K. Hopkins*, New York, N. Y. ELECTRIC ARC WELDING APPARATUS. Patent dated April 17, 1934. Disclaimer filed March 24, 1936, by the patentee; the assignee, *The M. W. Kellogg Co.*, concurring.

Hereby enters this disclaimer to claims 1, 2, 3, 4, 5, 11, and 12 in said specification.

[*Official Gazette April 21, 1936.*]